United States Patent [19]

Rebish

[11] Patent Number: 4,490,083
[45] Date of Patent: Dec. 25, 1984

[54] SEALING CAPPED NUT AND BOLT THEREFOR

[75] Inventor: Edward J. Rebish, Euclid, Ohio

[73] Assignee: Russell, Burdsall, & Ward Corporation, Cleveland, Ohio

[21] Appl. No.: 296,574

[22] Filed: Aug. 27, 1981

Related U.S. Application Data

[63] Continuation-in-part of Ser. No. 111,038, Jun. 10, 1980, abandoned.

[51] Int. Cl.$^3$ .................. F16B 33/00; F16B 37/00; F16B 37/14
[52] U.S. Cl. ..................... 411/338; 411/369; 411/429; 411/432; 411/902; 411/907
[58] Field of Search ............. 411/338, 339, 360, 366, 411/367, 368, 369, 429, 430, 431, 432, 531, 542, 546, 901, 902, 903, 907, 908

[56] References Cited

U.S. PATENT DOCUMENTS

| | | | |
|---|---|---|---|
| 1,475,827 | 11/1923 | Hogarty | 411/339 X |
| 1,962,035 | 6/1934 | Reiter | 411/338 X |
| 2,639,832 | 5/1953 | Bergstrom | 411/542 X |
| 2,752,814 | 7/1956 | Iaia | 411/542 |
| 3,273,441 | 9/1966 | Biesecker | 411/429 |
| 3,299,766 | 1/1967 | Gould et al. | 411/542 X |
| 3,411,816 | 11/1968 | Andrews et al. | 411/431 X |
| 3,414,304 | 12/1968 | Miller | 411/339 |
| 3,464,310 | 9/1969 | Lambert | 411/339 X |
| 3,471,158 | 10/1969 | Solins | 411/431 X |
| 3,494,246 | 2/1970 | Hensley | 411/339 X |
| 3,512,328 | 5/1970 | Eriksson | 411/339 X |
| 4,033,243 | 7/1977 | Kirrish et al. | 411/338 |

Primary Examiner—Thomas J. Holko
Attorney, Agent, or Firm—Pearne, Gordon, Sessions, McCoy, Granger & Tilberry

[57] ABSTRACT

Disclosed is a new fastening system particularly for fastening of fiber-reinforced polyester/plywood panels 14 to metallic structural members 16 in sealing engagement through apertures 18. The system has a sealing capped nut 10 for receiving in threaded engagement a bolt 12. Upon such engagement a formable shank portion 40 of the sealing capped nut 10 is deformed in a designed fashion to form a seal between the bolt 12 and the aperture 18 opening.

19 Claims, 19 Drawing Figures

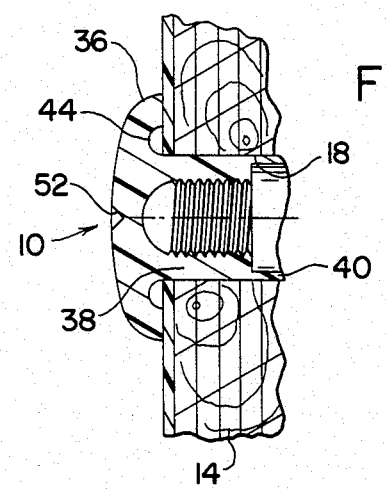
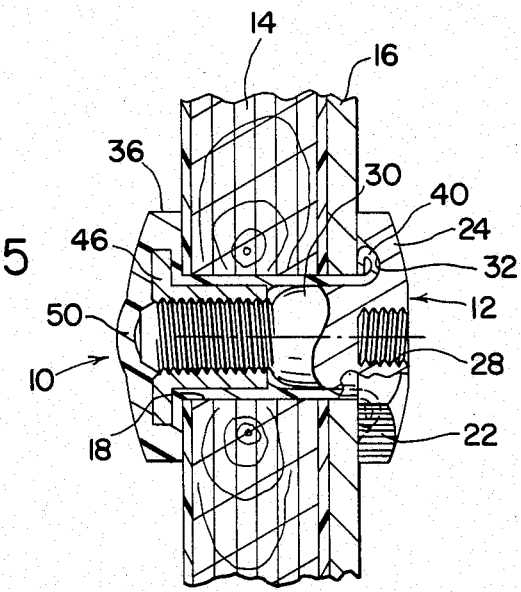
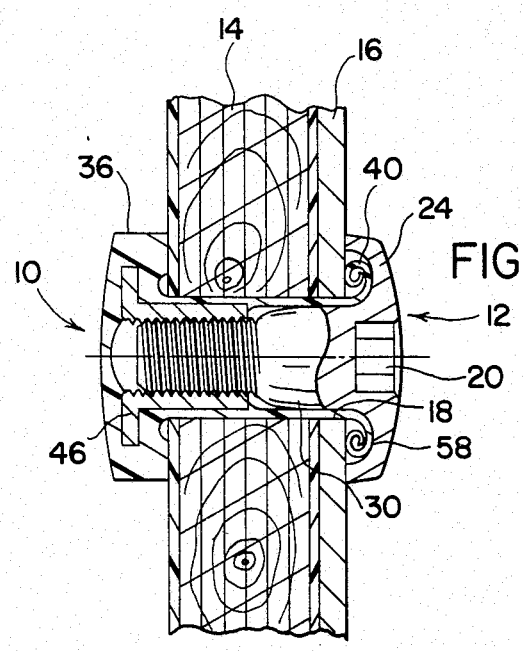

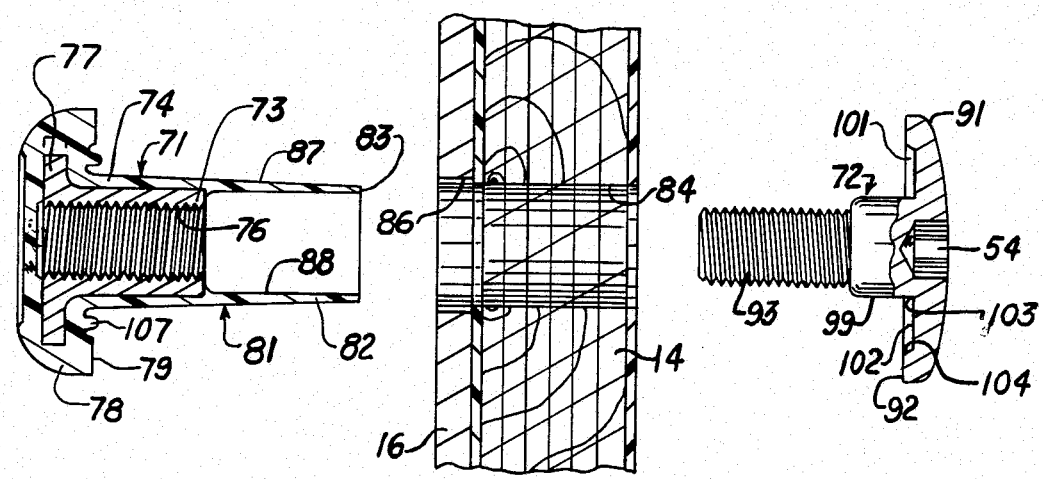
FIG. 13
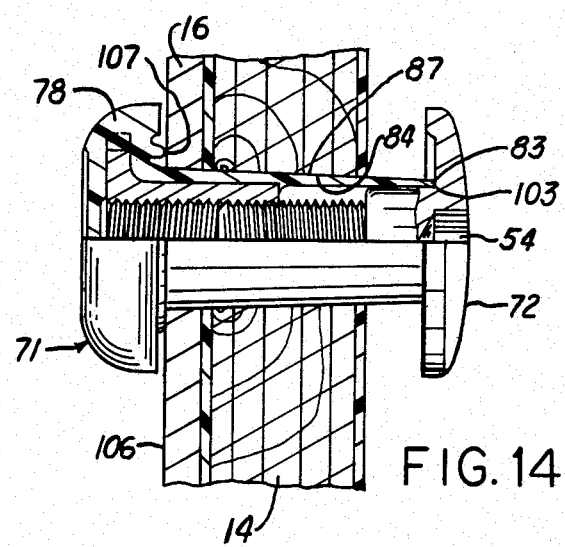
FIG. 14
FIG. 15
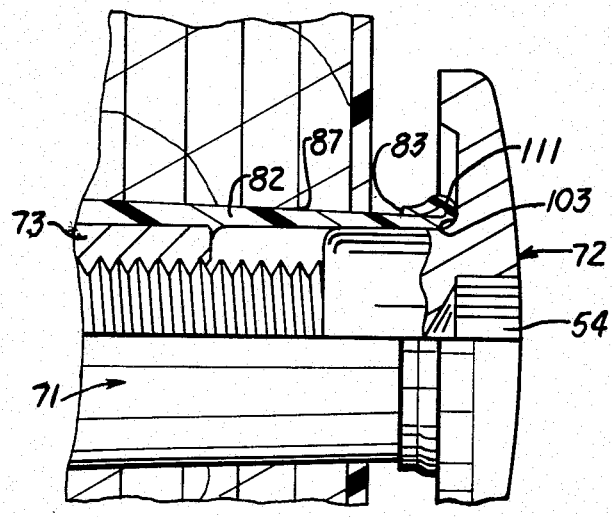
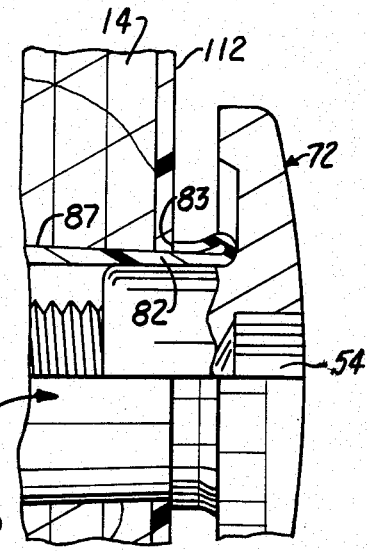
FIG. 16

SEALING CAPPED NUT AND BOLT THEREFOR

This is a continuation-in-part of my copending application Ser. No. 111,038 filed June 10, 1980, and now abandoned.

BACKGROUND OF THE INVENTION

1. Field of the Invention

The present invention relates generally to a fastening system for securing apertured members together in a secure and sealed condition by means of a sealing capped nut and a bolt therefor to receive a portion of a formable hollow shank on the capped nut for formation of a seal under the bolt head. More particularly, the present disclosure relates to an improved method for the fastening of apertured members made of fiberglass-reinforced polyester/plywood laminates to the structural members for transportation equipment, such as intermodal cargo containers and truck trailers for over-the-highway use by means of the use of a sealing capped nut having a formable hollow shank thereon to sealingly engage the bolt and the apertured members in secured engagement.

2. Description of the Prior Art

All metal intermodal cargo containers and truck trailers such as the all aluminum example thereof have been utilized in industry for a long period of time. The cost of these containers and trailers has risen substantially, due to the cost of the raw materials and the methods of manufacturing the finished product such that fiberglass-reinforced polyester/plywood is now being used to reduce costs and is experiencing rapid growth for the construction of such containers due to the lesser cost and improved characteristics such as structural integrity and aesthetic appearance. The use of these materials began some time in the late 1960's and early 1970's by truck trailer manufacturers who were experimenting with the material which today has achieved approximately 9-14% penetration of the marketplace for the use of such materials in truck trailers and truck bodies. These FRP/plywood materials generally consist of a layer of plywood sandwiched between two layers of reinforced plastic material. The plastic material can be of any polymeric substance, but most often has been of the polyester type being reinforced with glass fibers. The plastic is bonded by heat and pressure to the plywood core and the composite material combines the flexibility of plywood with the stiffness of fiberglass-reinforced plastic to provide a material which is lightweight and durable. This allows for the use of fewer structural members while providing good design aerodynamics and aesthetically pleasing exterior surface. Perhaps chief among the advantages of such material is the ease of repair of any damaged areas and its resistance to puncture.

The method of construction of containers and trailers of these materials is similar to that utilized in the construction of all metal containers or trailers. The problem with such FRP/plywood panels is that with apertures being drilled therethrough for the fastening of these panels to steel frames as in cargo containers or the extruded aluminum frames as in truck trailers, the exposure of the plywood core to the environment can cause problems with adhesive strength of the materials which have been laminated and with swelling and general deterioration of the plywood core. The typical 20' containers, for instance, require approximately 400 fasteners, while a typical 44' trailer requires generally about 600 fasteners to fasten the panels to the structural members. A mastic sealant is usually brushed on between the panels and the frame to help in sealing out moisture.

The requirement for a fastening system to achieve the fastening of these panels to their structural members are unusual, since the plastic overcoats are brittle in nature, while the core of plywood is highly compressible, causing problems if the fasteners are overloaded, and yet the fasteners must be loaded sufficiently to properly fasten the panels to their structural members. Furthermore, it is highly desirable to have the nut heads and bolt heads display a low profile on the exterior portions thereof to avoid hitting them in the use of these containers or trailers and to maximize the usable interior width and height of the container or trailer. In the past, several fastening systems have been utilized which are of the nut and bolt type to generally fill the apertures drilled therethrough to provide a sealing engagement to obtain a moisture-free internal bore on the materials.

One commonly used fastening system in this industry for fastening apertured panels of the FRP/plywood to the structural members for the production of cargo containers or tractor trailers consists of a sleeve which is inserted completely through the bore of the panels and the structural members which is inserted from the plywood side having a flange head which fits flushly over the plywood surface. Thereafter, a pin is inserted through the opposite side of the sleeve and subsequently an installation tool is applied to the pin tail and actuated to pull the pin into contact with the joint member and causing the sleeve end to curl and lock into the formed pin head, such as the action of a blind or pop rivet utilized for the connection of metallic panels. The installation tool thereafter breaks the pin in tension with a break point groove substantially flush with the head of the sleeve so that there is no projecting pin left to be cut off in a separate operation.

Another type of fastening system employs a bolt member generally having a gripping material on the threads adapted for engagement with a specially constructed tapped through nut member to achieve the desired clamping action between the frame and the panel sections. The bolt member includes an anti-rotation means which also achieves a centering of the threaded portion of the bolt relative to the panel apertures and is provided with a sealing element under the head. The nut member is engaged from the other side which has a drive means and a tapped through hole. Upon clamping engagement with the bolt, the sealing element provides protection against entry of moisture into the threaded portion of the assembly.

The first system mentioned above includes a significant disadvantage in terms of waste material consisting of the throw-away shank which is snapped off from the installed fastener. Furthermore, with this rather open flush mount side, moisture can enter into the cracks between the bolt and the sleeve member, promoting oxidation of the fastener, which can cause loosening of the fastener. This allows moisture to seep into the core of the aperture bore, resulting in swelling or deterioration of the plywood core. Furthermore, there is an inability to adjust or replace these fasteners conveniently.

A major problem and disadvantage of the second system mentioned above is the weight when up to 600 of these fasteners are used on each unit of production. Furthermore, by using a sealing collar on the bolt member of these fastener systems, there is no assurance of the integrity of the seal through the entire bore diameter of the apertures, thus causing a possible leak in the moistureproofing of these bore diameters. Furthermore, since these components are all metallic in nature, given the fact that different metallic materials are used with regard to the frame members for the structural support of the panels, electrolytic actions result, causing rapid oxidation of one of the members of the fastening system or the frames of the containers. This is highly undesirable aesthetically and could mean replacement of these members sooner than the wear life of the panels and the frame structures. The replacement of corroded components is difficult.

A further disadvantage of the second system is the cost of manufacture, since separate operations are required to manufacture the sealing element, the bolt, the nut, the installation of the sealing element on the bolt, and the thread gripping media on the bolt. Because it is hard to control the exact amount of thread gripping media, the torque-to-tension relationship can vary. When loosening of the fastener damages the thread gripping media, the torque-to-clamp force relationship can be destroyed.

Therefore, it would be exceedingly advantageous in terms of reducing manufacturing costs, maintenance problems, weight and providing extended life to the use of panels for the construction of cargo containers and tractor trailers to have a fastening system which will effectively seal, fasten, and solve the problems attendant to the use of such fastening devices for the fastening situation as hereinabove described.

SUMMARY OF THE INVENTION

Accordingly, it is an object of the present invention to provide a fastening system which is lightweight and simple to manufacture on a volume basis.

It is another object of the present invention to provide a fastening system which will provide a complete sealing of the bore diameter of the apertures of the panel and frame structures so as to provide a moisture-free internal bore where the plywood exists.

It is still a further object to provide a fastening system which will avoid the rapid oxidation due to the electrolytic effect of various metals touching one another.

It is still a further object to provide a fastening system for securely fastening the FRP/plywood panels to structural members while providing an aesthetically pleasing appearance.

These and other objects of the present invention, together with the advantages thereof over existing and prior art forms, will become apparent to those skilled in the art from the following specification and drawings.

It has been found that a fastener for sealingly fastening apertured members together can comprise a bolt, a sealing capped nut, the bolt having a shoulder portion thereon, and the sealing capped nut having a flexible hollow shank for engaging the shoulder of the bolt so as to provide expansion of the flexible shank to sealingly engage the bolt and the apertured members.

BRIEF DESCRIPTION OF THE DRAWINGS

FIG. 4 is a partial side section view of a sealing capped nut.

FIG. 5 is a side section view of a sealing capped nut and bolt therefor according to another embodiment of the present invention.

FIG. 6 is a side section view of a sealing capped nut and bolt therefor according to another embodiment of the present invention.

FIG. 13 is an exploded view partially in section illustrating another embodiment in which an improved sealing hem is formed between the head of the fastener and the panel when installation is complete.

FIG. 14 illustrates the embodiment of FIG. 13 partially installed when the end of the sealing shank engages the underside of the bolt head.

FIG. 15 is an enlarged fragmentary view of the installation process when the sealing shank has folded back upon itself but has not yet reached the panel surface.

FIG. 16 is another enlarged fragmentary view of a later point in the installation process when the end of the sealing shank is folded back a sufficient amount to cause its end to engage the panel.

DESCRIPTION OF THE PREFERRED EMBODIMENTS

Figure 1:
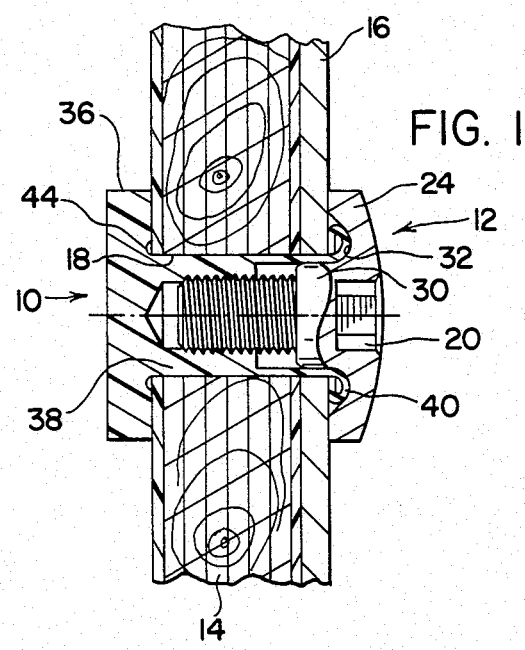
FIG. 1 is a side section view of a sealing capped nut and bolt therefor according to one embodiment of the present invention.

Referring particularly to FIG. 1 of the drawings, it can be amply seen that the fastening system of the subject invention generally consists of two members, the sealing capped nut 10 and a bolt 12 therefor. The sealing capped nut 10 and accompanying bolt 12 can be utilized as shown in the figures of the drawings to fasten apertured members such as a fiberglass-reinforced polyester/plywood panel 14 to a metallic structural member 16. Each of the structural and panel members 16 and 14 have apertures 18 therethrough of a like size bore diameter so that upon proper alignment, the sealing capped nut 10 and bolt 12 can sealingly fasten the members together. The bolt 12 will generally be metallic in nature and may be made from materials such as aluminum, iron, steel, or the like in accordance with standard specifications of conventional manufacture familiar to those skilled in the art.

Figure 3:
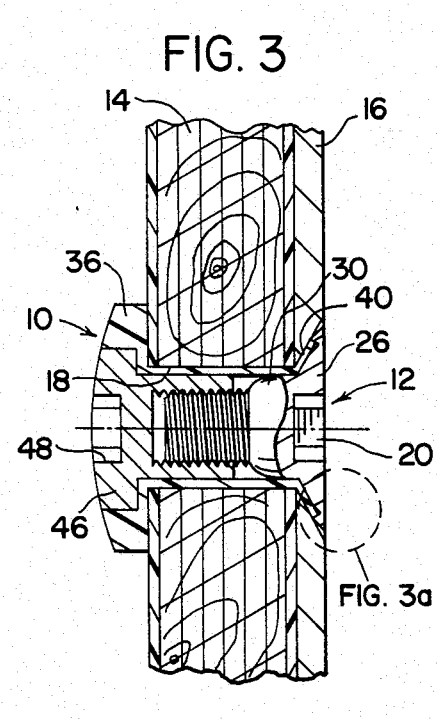
FIG. 3 is a side section view of a sealing capped nut and a countersunk bolt therefor according to another embodiment of the present invention.
Figure 3A:
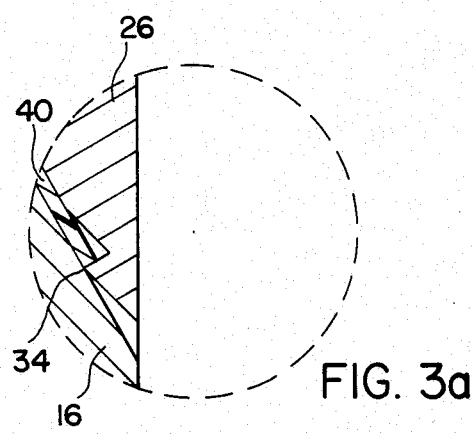
FIG. 3a is an enlarged section taken from FIG. 3 as indicated.
Figure 11:
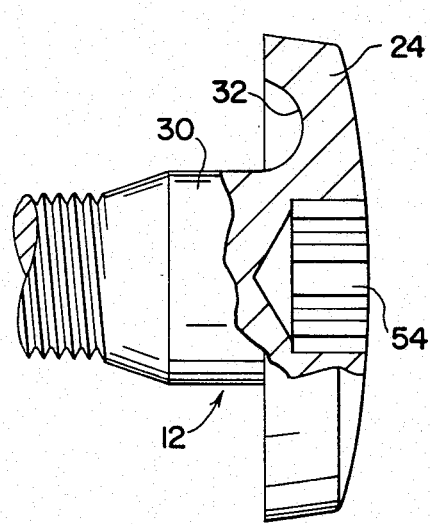
FIG. 11 is a side elevation view in partial section showing an internal drive means on a bolt segment.
Figure 12:
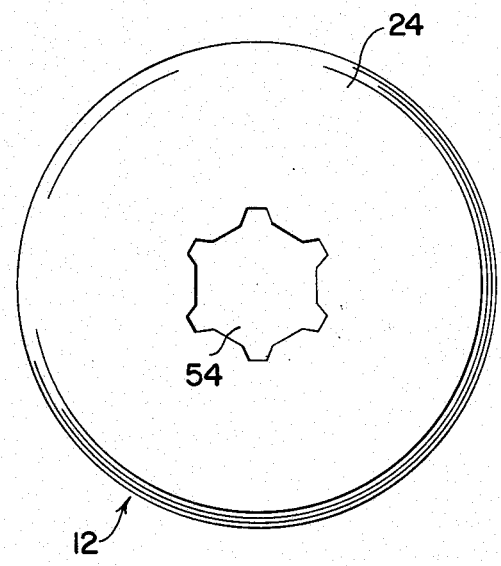
FIG. 12 is a top plan view of the internal drive means shown in FIG. 11.

The drive means on the bolt can either be an internal hex 20, as indicated in the figures, an external hex 22, as seen in FIG. 5, or any of a number of other standard drive configurations or anti-theft drive configurations as those skilled in the art will readily realize are suitable for such driver means. An internal drive means such as internal hex 20 on the special internal drive means seen at 54 in FIGS. 11 and 12 are preferred from the standpoint that a lower form of head 24 of bolt 12 can be utilized so as to maximize the interior space of the cargo container or trailer assembled in this fashion. A method of maximizing such internal space would be to utilize a spray head 26 on bolt 12 and countersink same into the structural member 16 to achieve a flush mounting as seen in FIG. 3. The bolt head 24 may also conveniently be used as a hold-down point by having a tapped center 28, as seen in FIG. 5, to receive the external threads for engagement of various hold-down instrumentalities, such as a hook, eye, or the like, to which straps or ropes can be fastened to anchor the cargo into the interior of the container or trailer. As will occur to those skilled in the art, this may be accomplished on bolts 12 having heads 24 with either an external or internal drive means. Where internal drive means are used, the tapped center 28 will be deeper and of slightly smaller diameter than the internal drive means.

The bolt 12 preferably has a shoulder portion 30 along the shank of the bolt 12 nearest the bolt head 24 to receive and engage the sealing capped nut 10 to serve as a pilot diameter to assure proper alignment of the bolt 12 into the sealing capped nut 10 upon insertion. The bolt 12 shoulder portion 30 will have a diameter large enough to engage the sealing capped nut 10 against the bore diameter of the apertures 18. This engagement between the shoulder portion 30, the sealing capped nut 10, and the bore diameter of apertures 18 will also serve to protect the FRP/plywood panels 14 from the environmental elements which tend to swell or otherwise destroy the FRP/plywood panels 14 while in use on a trailer or container.

Figure 2:
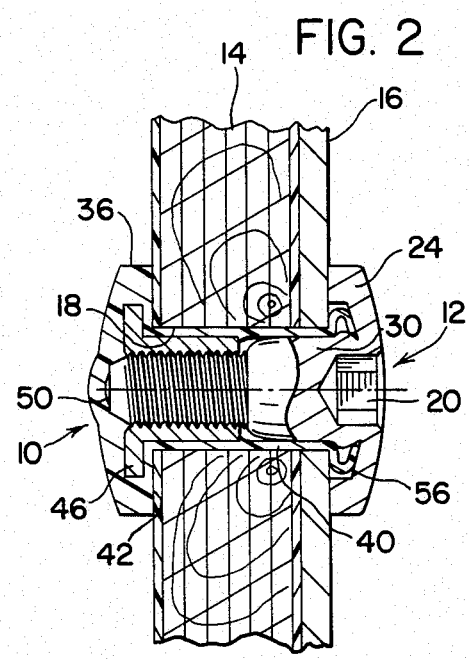
FIG. 2 is a side section view of a sealing capped nut and bolt therefor according to another embodiment of the present invention.

The bolt 12 at the intersection of the bolt head 24 and the shoulder portion 30 of the shank may be designed to further engage the portion of the sealing capped nut 10 so as to either cause a hemming of a portion of the material of the sealing capped nut 10, as by a small radius annular recess 32 in accordance with FIGS. 1, 5, 7, 8, 9, and 10 of the drawings. A shallow radius may spread a portion of the material of the sealing capped nut 10 so as to cause a sealing engagement, as amply seen in FIG. 3 is well suited for a spreading of the portion of the material of the sealing capped nut 10 so as to cause a seal upon the countersink bore of the bolt 12. Furthermore, such a spray head 26 on a bolt 12 may have an annular cutoff 34 so as to trim a portion of the material of the sealing capped nut 10 so as to assure a complete sealing engagement with the FRP/plywood panel 14 and the metallic structural members 16. An annular channel 56 may be used to reverse hem the sealing capped nut 10, as seen in FIG. 2, or a roll form radius 58 may be used to roll a portion of the sealing capped nut 10, as seen in FIG. 6. As seen in the drawings, the sealing capped nut 10 is made for engagement with bolt 12 to sealingly fasten the FRP/plywood panel 14 to the metallic structural members 16, as by the clamp force of such threaded engagement between the bolt 12 and the sealing capped nut 10.

The sealing capped nut 10 may be conveniently made by many conventional molding techniques of a polymeric material which is capable of allowing threaded engagement with the bolt 12 to accomplish the clamp force necessary to fasten the FRP/plywood 14 to the metallic structural member 16. Examples of such polymeric materials which are thought to be suitable for use of such a sealing capped nut 10 would include: acrylonitrile-butadiene-styrene terpolymers, acetals, acrylics, cellulosics, fluoroplastics, nylons, phenylene oxides, polyaryl ethers, polyaryl sulfones, polycarbonates, polyesters, polyethylenes, polyphenylene sulfides, polypropylenes, polystyrenes, polysulfones, polyvinyl chlorides, urethanes, styrene-acrylonitrile copolymers, and various reinforced materials, such as styrenic materials with as much as 40% fiberglass loading, polyolefins with up to 40% glass fiber loading, polysulfones and polycarbonates with up to 50% reinforcing material loading, nylons and acetals with 60% reinforced loading, polyurethanes with up to 40% glass fiber loading, thermoplastic polyesters with up to 40% glass fiber loading, polyphenylene sulfides with up to 50% fiberglass loading, and various other materials as would occur to those skilled in the art for use in the subject invention.

Furthermore, soft or formable metals thought to be suitable for the sealing capped nut 10 include aluminum, low carbon steel, copper, brass, bronze, and other alloys as may occur to those skilled in the art.

The sealing capped nut 10, in addition to having a nut head portion 36, has a flexible hollow shank consisting of a thick wall shank 38 nearest the head portion 36 and a thin wall shank 40 for sealing engagement with the bolt 12. The thick wall shank 38 is utilized for threaded engagement with the bolt 12. The thick wall shank 38 is utilized for threaded engagement with the bolt to provide the clamp force necessary for the fastening of the FRP/plywood panels 14 to the metallic structural members 16. The polymeric substance may be molded so as to provide two starting threads in the thick wall shank 38 and allowing the bolt 12 to thereafter form the threads in the thick wall shank 38, as by engaging the bolt 12 therein. The bolt 12 may also have a self-tapping type thread design well known to those skilled in the art to complete the thread engagement with the sealing capped nut 10.

Figure 9:
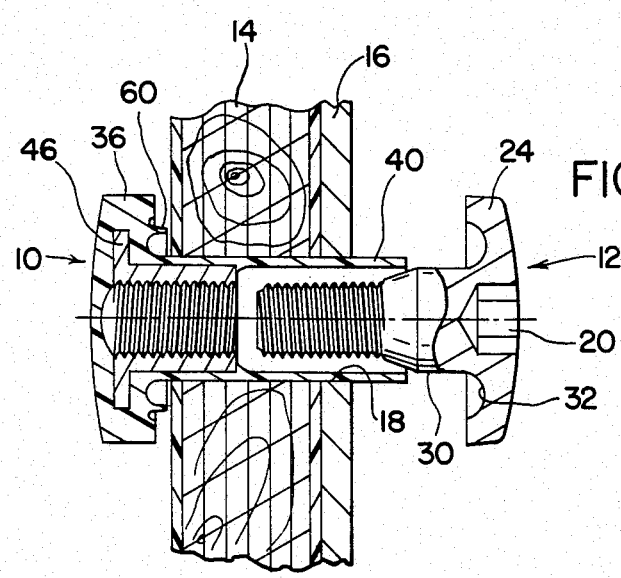
FIG. 9 is a side section view of a sealing nut and bolt therefor just prior to engagement therebetween.
Figure 10:
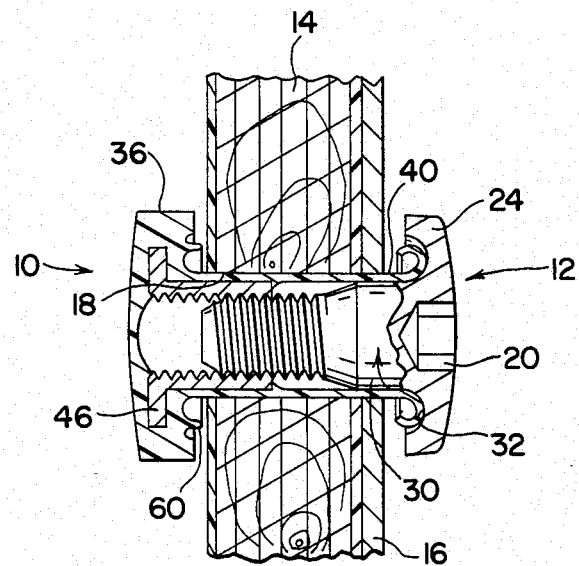
FIG. 10 is a side section view of a sealing capped nut and bolt therefor partially engaged showing the forming of the seal.

As the bolt 12 is engaged into the thick wall shank 38 of the sealing capped nut 10, the thin wall shank 40 of the sealing capped nut 10 is engaged upon the shoulder portion 30 of the bolt 12. As seen in FIG. 9, a sealing capped nut 10 is made of a shank length slightly in excess of the total thickness of the materials to be clamped together so as to provide a slight excess of material in the thin wall shank 40 of the sealing capped nut 10 in which to engage and be hemmed underneath the bolt head 24, as seen in the drawings, or to be spread and cut off, as seen in FIG. 3 of the drawings. FIG. 10 illustrates how the hemming of the thin wall portion 40 of the sealing capped nut occurs prior to full engagement of bolt 12 into sealing capped nut 10. Once the bolt 12 has been engaged, the thin wall shank portion 40 of the sealing capped nut 10 should have such memory as to remain in its hemmed or sprayed position so that the bolt 12 may be replaced with another bolt of similar design without disengagement of the sealing capped nut 10. This way the sealing capped nut 10, with its thick and thin shank portions 38 and 40, will sealingly engage the bore diameter of the apertures 18 even though the bolt 12 is removed.

The nut head 36 may be formed of a number of convenient and aesthetically pleasing forms, as by internal or external drive means on the face thereof, or as a button type face as seen in FIG. 4 of the drawings. The main consideration involved in the nut head 36 is that it seal properly and completely the aperture 18 in the fiberglass-reinforced polyester/plywood panel 14. This can be accomplished by having a flat bearing surface 42 as seen in FIG. 2, an annular recess 44 as amply seen in FIGS. 1 and 4, an annular skirt 60 as seen in FIGS. 9 and 10 of the drawings, and numerous other configurations as will occur to those skilled in the art and be suitable for providing a sealing engagement of the nut head 36 against the fiberglass-reinforced polyester/plywood panel 14.

In all of the sealing capped nuts 10, the shank portion will be of the polymeric material, and particularly the thin wall shank 40 must be a formable hollow nature so as to allow expansion and hemming of the material underneath the sharp radius annular recess 32 of the bolt 12 as seen in FIGS. 1, 2, 5, 6, 7, 8, and 9 or the spreading and flattening of the thin wall shank 40 under the spray head 26 of the bolt 12, as seen in FIG. 3. In the all-polymeric material sealing capped nut 10, the thick wall portion 38 can have molded therein at least a couple of starting threads to receive in threaded engagement the bolt 12, or may have fully formed threads through the length of the thick wall shank 38 for receiving the bolt 12 in threaded engagement.

To further strengthen the sealing capped nut 10, an engagement insert 46 may be molded into the sealing capped nut 10 to provide an additional reinforcement of the sealing capped nut 10 structure. The engagement insert 46 may be of a metallic nature, such as aluminum, iron, steel, or the like. Furthermore, the use of such engagement insert 46 will allow the use of either a coarse thread on the bolt 12 or a fine thread on the bolt 12 for tight and secure engagement of the sealing capped nut 10. A preferred example of such a mold in-place engagement insert 46 can be seen in FIGS. 2 and 5 of the drawings. Furthermore, as seen in FIG. 3 of the drawings, engagement insert 46 may be inserted through the nut head 36 so as to provide an ample fixture for receiving either an internal drive means 48, as shown in FIG. 3, or a tapped center similar to tapped center 28 in FIG. 5 for receiving threaded eyes or the like for tying down the cargo to the container or fastening the container.

Figure 7:
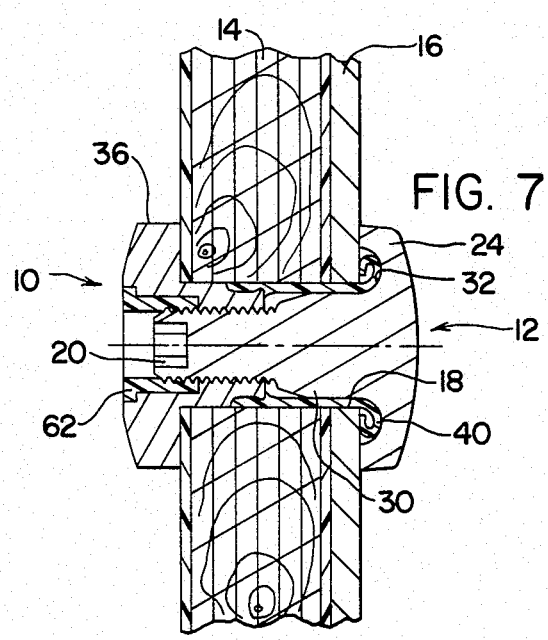
FIG. 7 is a side section view of a sealing nut and bolt therefor according to another embodiment of the present invention.

As seen in FIG. 7, the bolt 12 can be a button head 24 of a tamperproof design, and the sealing capped nut 10 may be metallic having an internal drive means with a seal insert 62 and a thin wall portion 40 to allow driving the bolt 12 by its internal drive means 20 in the threaded end of bolt 12.

Figure 8:
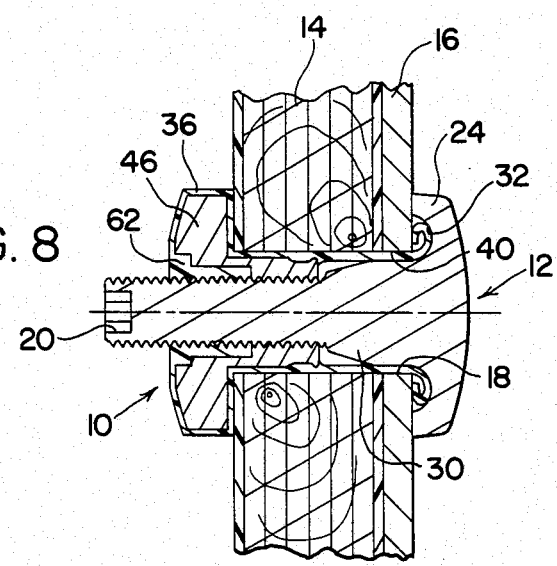
FIG. 8 is a side section view of a sealing capped nut and bolt therefor according to another embodiment of the present invention.

Another embodiment may be seen in FIG. 8, where the engagement insert 46 is molded into a thin section of polymeric material to form a seal insert 62 and the thin wall portion 40 in one operation on an external drive means sealing capped nut 10. By using a bolt 12 having an internal drive means 20 in the theaded end of a length in excess of that needed, the bolt 12 may be fully engaged to leave a threaded portion exposed, as seen in FIG. 8. The extra length may be used for a further locking nut for extra security in critical applications, or as a convenient point to attach hardware to for numerous applications. Alternatively, the threaded portion of bolt 12 could have a breakaway portion such as that seen in U.S. Pat. No. 4,138,921, hereby incorporated by reference. With such a breakaway portion, the bolt 12 cannot thereafter be readily removed, thus providing a security feature.

Since in the application of fiberglass-reinforced polyester/plywood panels 14 to metallic structural members 16 for the construction of cargo containers or trailers for over-the-highway requires many bolts 12 and sealing capped nuts 10, a tightness bulbous 50 is a convenient way to check the tightness of these bolts 12 without much effort on the part of the inspector. Such a tightness bulbous 50 as seen in FIGS. 2 and 5 of the drawings can be either molded into the all-polymeric form of the sealing capped nut 10 or conveniently formed with the engagement insert 46 in place. The slight bulging of the nut head portion 36 will visually indicate that the bolt 12 is fuly engaged in the sealing capped nut 10.

For application where it is anticipated that replacement of the sealing capped nuts 10 may be desirable or necessary, a drill-out dimple 52 can be molded into the center top of the sealing capped nut 10 to provide a quick and ready indexing point for a drill bit to conveniently drill out the sealing capped nut when desired. It is anticipated that with the all-polymeric sealing capped nut 10 that a drill bit the size of the aperture 18 bore diameter could be used to quickly and easily drill out any sealing capped nuts 10 as desired.

It can be seen that a sealing capped nut 10 according to the precepts of the present invention will accomplish a complete sealing of the outermost portion of a fiberglass-reinforced polyester/plywood panel 14 as attaching it to a metallic structural member 16. Furthermore, the sealing capped nut 10 can be colored as by conventional coloring of plastic materials upon injection molding or other form of molding same so as to achieve color coding or aesthetic appearance as desired upon the outside of such FRP/plywood panels 14. This accomplishes a sealing and aesthetically pleasing appearance which is a significant improvement over that of the prior art. Furthermore, the use of a plastic or polymeric substance for the manufacture of the sealing capped nut 10 will achieve an insulation against electronic or electrical current flow, thus reducing to zero the prospect of electrolytic reaction between the sealing capped nut 10 and the metal structural members 16. This will significantly reduce the prospect of rapid oxidative destruction of the bolt 12.

Additionally, it is expected that the use of a polymeric material for the construction of sealing capped nuts 10 will significantly reduce the weight added to a cargo container or a tractor trailer by virtue of the approximately 600 of these units utilized to fasten the fiberglass-reinforced pdlyester/plywood panels 14 to the metallic structural members 16 of the unit. Furthermore, the sealing capped nut 10 could also be cast with axially disposed ribs on the thick wall shank portion 38 for anti-rotation of the sealing capped nut 10 such that the sealing capped nuts 10 may be inserted from one side and tightened down from the other side with bolts 12 so as to accomplish a one-man installation system for fastening the FRP/plywood panels 14 to the metallic structural members 16. This would significantly reduce the labor involved in assembling cargo containers or tractor trailers.

It is also anticipated that sealing capped nut 10 can be molded with a bellowslike expansion joint to be contained within the area of the thin wall shank 40 of the sealing capped nut 10 to achieve a standard production size of sealing capped nut 10 which will accommodate panels 14 and metallic structural members 16 of slightly varying thicknesses in a uniform manner to assure complete sealing of the apertures 18 in the FRP/plywood panels 14 and metallic structural members 16. In terms of repairing a specific fastener according to the precepts of the present invention, a single installer could remove a bolt 12 from a sealing capped nut 10 while retaining the sealing capped nut 10 in place, since the hem portion of the thin wall shank 40 would retain the sealing capped nut 10 in place. This allows an installer to simply remove one bolt 12 to be replaced with another bolt 12 if desired. Furthermore, if it is desired to remove the sealing capped nut 10, the hemmed portion of the thin wall shank 40 could be simply cut off the sealing capped nut 10 by means of a knife or razor blade and utilizing a drift pin or punch to thereafter punch out the sealing capped nut 10 in a simple mode of repair for a damaged sealing capped nut 10. It is anticipated that this form of cold-formed memory of the thin wall shank 40 polymeric material will allow simplified and quick repair of any given damaged bolt 12 or damaged sealing capped nut 10, thus significantly reducing the cost in maintaining the cargo containers or tractor trailers in a state of total repair.

FIGS. 13 through 18 disclose another embodiment which includes a nut 71 and bolt 72 structured to provide a substantially flat double layer radial hem when assembled. Referring to FIG. 13, the nut 71 includes a metallic insert 73 encased within a polymeric material 74. Here again, the nut insert 73 is centrally threaded at 76 along its axis and is provided with a noncircular anchoring flange 77. The polymeric material is molded to provide a head portion 78 encasing the flange 77 and providing a clamping face 79 on the underside of the head portion 78. Further, the polymeric material in cooperation with the insert 73 provides a shank 81 providing a tubular end portion 82 extending to an end 83. The shank 81 is proportioned to fit through apertures 84 and 86, respectively formed in the panel 14 and structural member 16.

In this embodiment, the exterior surface 87 of the shank 81 is tapered to provide a diameter which reduces as the shank extends from the head 78 to the end 83. The interior surface 88 of the tubular portion 82, however, is normally of a uniform diameter to simplify the molding process. The aperture 84 in the panel 14 is sized so that it is at least as large in diameter as the exterior diameter of the tubular portion 82 at the end 83 so that the end 83 can pass into an through the aperture 84 without an interference fit. However, the increasing diameter provided by the taper at locations back from the end 83 is selected so that an interference fit is developed between the aperture 84 in the panel 14 when the nut 71 is driven into the aperture 84, as illustrated in FIG. 14. In fact, because the material of the panel is somewhat compressible, the aperture 84 tends to be enlarged and tapered by the interference fit between the surface 87 of the nut and the surface of the material of the panel, as illustrated in FIG. 14.

The aperture 86 in the framing member 16, however, is preferably formed with a slightly larger diameter substantially equal to the diameter of the shank adjacent the head 78 so that the surface of the polymeric material 74 is not shaved back by the edge of the metal during the insertion of the nut. On the other hand, in the instances in which the properties of the material forming the element which is positioned at the large end of the shank are either compressible or otherwise incapable of producing such shaving action, the diameter of the aperture 86 can be essentially the same as the diameter of the aperture 84.

The bolt 72 is again formed with a head portion 91 having a clamping surface 92 on the underside thereof. The bolt is provided with a threaded shank 93 proportioned to mate with the threads 76 in the nut insert 73. The shank also includes an enlarged diameter shoulder 99 extending from the head portion to the threaded shank portion 93. The shoulder is sized to closely fit the interior of the tubular portion 82 of the nut to support it against collapse as the hem is formed.

The clamping surface includes a shallow annular recess 101 which has an inner diameter equal to the diameter of the shoulder portion 99, a substantially flat back wall 102 and a relatively sharp corner 103 at the inner extremity of the flat wall 102 at the junction thereof with the exterior of the shoulder portion 99. This corner 103 should have a sharp radius, preferably substantially sharper than the radius of curvature provided in the annular recess 32 illustrated in FIG. 1 for the reasons set forth below. The exterior of the recess is defined by an inclined face 104.

FIGS. 14 through 17 illustrate the progressive assembly of the embodiment of FIG. 13. As illustrated in FIG. 14, the nut 71 is positioned in the apertures 84 and 86 to a location in which the head portion 78 is substantially adjacent to the outer surface 106 of the framing member 16. In the illustrated embodiment, the underside of the headed portion 78 is provided with an annular lip 107, which engages the surface 106 when the nut 71 is initially installed. Because an interference fit is provided between the shank 81 and the aperture 84 through the panel 14, it is normally necessary to drive the nut into the position of FIG. 14, usually with a mallet or the like. After the nut is positioned as illustrated in FIG. 14, the bolt 72 is threaded a portion of the way into the nut to the position in which the end 83 engages the underside of the head 91 at the sharp corner 103.

Because the nut is press-fitted into the panel, it is not necessary to provide any wrenching or driving system on the nut face, and the completion of the assembly after the nuts are driven into position can be accomplished solely from the bolt side of the assembly. This is a significant advantage of this embodiment, since two people are not required to assemble the device.

As the bolt 72 is tightened beyond the position of FIG. 14 to the position of FIG. 15, the end 83 commences to fold back along the tubular portion 82, as illustrated. Because a sharp radius or a relatively sharp corner 103 is provided, the end does not form a relatively loose coil as illustrated in FIG. 1 but, instead, actually slides along the exterior surface 87 of the tubular portion. A small radius is provided, however, at the corner 103 so that the tubular portion will be deflected radially outwardly as it is pressed against the corner 103 and will not produce buckling.

As illustrated in FIG. 15, a small loop 111 is formed adjacent to the corner, but the elastic memory of the material causes the end 83 to return to engagement with the exterior surface 87 and to slide therealong as the bolt is tightened into the nut to form a preliminary double layered axially extending hem. During the forming of the preliminary hem, the tubular portion is supported against internal collapse by the shoulder 99.

Figure 17:
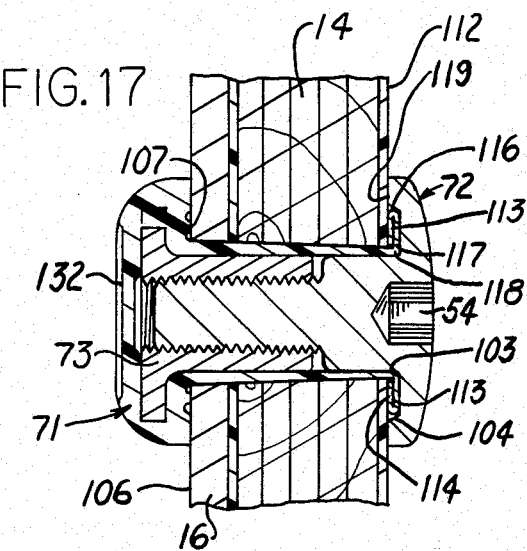
FIG. 17 illustrates the fully installed embodiment of FIG. 13 when such embodiment is installed with a panel and framing of a minimum thickness.

As the bolt 72 continues to be threaded into the nut 71, a point in the assembly is reached when the end 83 of the tubular portion 82 engages the surface 112 of the panel 14. This engagement prevents further movement of the end along the outer surface 87 of the tubular portion 82. Continued tightening of the bolt then operates to cause the preliminary hem to be deformed radially outwardly until the fully clamped position of FIG. 17 is reached. In such position, a folded radially extending hem 113 is produced at the outer end of the tubular portion 82 having a double thickness including an inner layer 114 extending radially from the end 83 along the surface 112 of the panel 14 to a reverse bend at 116 adjacent to the outer surface 104 of the recess. From the reverse bend at 114, an outer layer 117 extends radially inward a right-angle bend 118 at the corner 103.

The depth of the recess 101 is selected so that the hem 113 is tightly pressed against the surface 112 when the fastener is fully assembled as illustrated in FIG. 17. Preferably, the depth of the recess is slightly less than the thickness of the hem so that full compression is achieved to ensure a good seal between the hem and the surface 112 when the outer portion of the clamping surface 119 engages the surface 112. In such condition, the annular lip or projection 107 is compressed to ensure a good seal against the surface 106 of the framing member 16 and the head of the nut is fully seated.

FIG. 17 illustrates the fastener assembled with a panel and frame having a thickness at the minimum range of thicknesses for which the particular fastener assembly is sized. In such instance, the hem 113 has a radial width substantially filling the recess 101 and, in such condition, the inner end of the shoulder 99 is spaced a small distance from the end of the insert 73.

Figure 18:
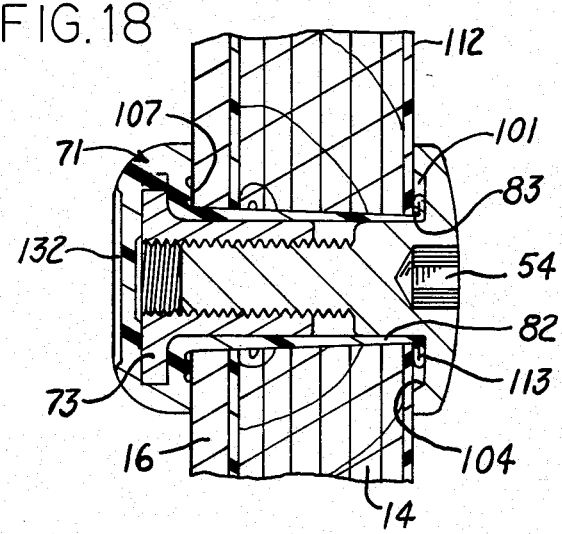
FIG. 18 illustrates the fully installed embodiment of FIG. 13 when such embodiment is installed with a panel and framing of maximum thickness.

The illustrated assembly, however, can be assembled with panels 14 and framing members 16 having a somewhat greater thickness than that illustrated in FIG. 17 as illustrated in FIG. 18. In such instance, the hem 113, which is formed during the assembly, is not as wide as the hem illustrated in FIG. 17. However, full clamping is achieved because the hem of FIG. 18 consists of the two layers having a total thickness of the hem illustrated in FIG. 17.

When the fastening system is assembled as illustrated in FIG. 18, the difference in thickness of the articles being clamped is automatically compensated for by a corresponding change in the radial width of the hem and the hem 113 does not radially fill the recess. However, full clamping and sealing functions occur in the same manner as illustrated in FIG. 17.

Because the hem is formed with a double thickness, a given difference in the total thickness of the panel 14 and framing member 16 changes the radial extent of the hem by about one-half the difference in total thickness. Therefore, a nut 71 of a given size can be used to clamp assembly of a substantial range of thicknesses.

After an assembly is installed and the hem is formed, the bolt can be easily removed to be replaced by a different form of bolt or to replace a damaged bolt. In such instance, the hem 113 remains substantially adjacent to the surface 112 even though it may flare slightly away from such surface in a radially outward direction. The double-layer structure of the hem is important to retain the hem in a substantially radial condition even when the bolt 72 is removed. This is because the inner layer is in tension and is displaced inwardly from the right-angle bend at 118 to counteract the tension forces in the outer layer 117 which would otherwise tend to cause the elastic memory of the polymeric material to cause the hem to fold back out upon removal of the bolt. The inner layer produces a force couple which holds the hem in a substantially radial condition. Because the hem tends to remain in a radial condition, the nut alone operates to hold the panel and framing member clamped together against reasonably large separating forces even when the bolt is removed. This prevents separation of the clamped members even when a bolt is removed during a repair operation. When the bolt is reinstalled, however, the hem is reclamped to its original installed condition and a full seal is provided.

If, at any time, it is desired to remove the nut, it is a simple matter to insert a rodlike tool into the tubular portion and drive the nut out. When this is done, the hem is unfolded and the elastic memory of the material tends to then cause the tubular portion to return to its original shape. In such case, the tubular portion tends to crease where the folds have existed, but the nut can normally be reused.

Figure 19:
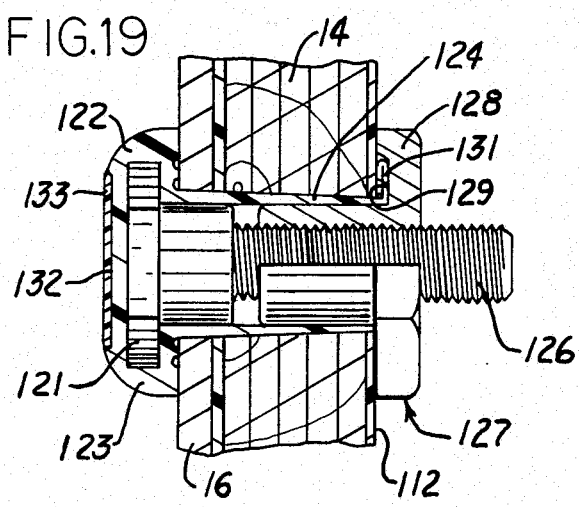
FIG. 19 is a variation of the embodiment of FIG. 13 in which the bolt is covered with the plastic sealing material and the hem seal is formed at the nut end.

FIG. 19 illustrates a modification of the embodiment of FIGS. 13 through 18. In this modified form, the bolt and nut are reversed in that a metallic bolt 121 is encased within a polymeric material 122 which provides the head portion 123 and the tubular shank portion 124 spaced from the threaded shank portion 126 of the bolt 121. In this instance, a tube nut 127 is threaded onto the threaded portion 126 and provides a head 128 with an annular hem forming recess 129. Here again, an interference fit is provided between the polymeric portion of the bolt and the apertures in the panels 14 in the same manner as the embodiment of FIG. 13 and a double-layered, radially extending flange 131 is provided.

In this illustrated embodiment, the threaded shank 126 of the bolt extends beyond the nut and provides an extension which can be used to mount tie-down brackets or the like. Further, the head 123 is formed with a shallow recess 132 in which a reflective material or other decorative material 133 can be installed, for example, by adhesive. Preferably, the recess 132 has a depth at least as great as the thickness of the material 133 so that such material will be either flush with the head surface or recessed back therefrom. In fact, in the embodiment of FIGS. 13 through 18, a similar recess is provided in which a reflective or decorative material can be positioned in such recess in the same manner as illustrated in FIG. 19.

In the double-layer hem embodiment of this invention, the hem is formed essentially by folding operations which do not require as much force as the formation of hems by a rolling-type operation as illustrated in FIG. 1. Such folding operations tend to reduce the force required to fully clamp or seat the assembly and the embodiments of FIGS. 13 through 19 are preferred when it is desired to reduce the forces required to achieve the assembly. Further, when the full seating occurs, a substantial area of contact occurs with the surface, causing a sharp increase in the torque required for further rotation of the bolt or nut, as the case may be, so the user is less likely to overtighten assembly or not complete the seating operation.

Thus, it should be apparent to those skilled in the art from the foregoing description of the preferred embodiments that the sealing capped nut and bolt method of fastening fiberglass-reinforced polyester/plywood panels to metallic structural members herein shown and described accomplishes the objects of the invention and solves problems attendant to such fasteners in these fastening situations.

What is claimed is:

1. A fastener system for sealing and fastening apertured articles comprising first and second members providing interfitting means operable when said members are assembled to secure said members together, each member providing a clamping face which cooperate when said members are assembled and interconnected by said interfitting means to engage and clamp against opposite surfaces of said articles, one of said members providing a reduced diameter shank extending from its clamping face proportioned to extend into said apertures in said articles and providing a single-layer tubular end having a substantially uniform diameter formed of deformable material, said shank having a length greater than the length of said apertures in said articles, said clamping face on the other of said members providing roll hem forming means operating when said members are assembled to radially deform said tubular end and produce a radially extending peripherally continuous rolled hem having at least two radially extending layers which engages the adjacent surface of said article around said aperture and is clamped into sealing engagement therewith by said clamping face of said other member, said one member operating to produce a seal with the adjacent surface of said articles around said apertures and in cooperation with said shank thereof and said hem to create a full seal of said apertures when said members are assembled.

2. A fastener system as set forth in claim 1, wherein said interfitting means are threads operating when said members are threaded together to move said clamping faces toward each other and cause said hem to be formed by said hem forming means.

3. A fastener system as set forth in claim 2, wherein said shank is sized to fit said apertures with an interference fit which operates to prevent rotation of said one member when said members are threaded together by rotation of said other member.

4. A fastener system as set forth in claim 3, wherein said shank is formed with a taper providing progressively decreasing external shank size at locations progressively spaced from said clamping face thereof.

5. A fastener system as set forth in claim 2, wherein said one member is a nut formed with a female thread and said other member is a bolt provided with male threads operable to mate with said female threads.

6. A fastener system as set forth in claim 2, wherein said one member is a bolt providing a male thread along said shank and said other member is a nut providing a female thread.

7. A fastener system as set forth in claim 1, wherein said hem forming means is an annular recess in said clamping face of said other member operable when said members are moved toward each other to engage the end of said tubular portion and radially deform said end to produce said hem.

8. A fastener system as set forth in claim 7, wherein said annular recess is formed with a radius sized to cause a rolled hem.

9. A fastener system as set forth in claim 7, wherein said recess provides a relatively sharp corner which operates to fold said end of said tubular portion back along the outer surface thereof to produce an axial extending preliminary double layer hem, said recess also providing a radially extending surface operable thereafter to radially deflect said double layer hem to produce a radially extending hem consisting of two radially extending layers.

10. A fastener system as set forth in claim 2, wherein said hem forming means operates to engage the end of said tubular portion and cause said tubular portion to fold back upon itself until said end engages the adjacent side of said articles to form an axially extending double layer hem, said hem forming means thereafter operating to radially deform said axially extending double layered hem to a radial direction to produce a radially extending double layer hem adjacent to the adjacent surface of said articles.

11. A fastener for sealingly fastening apertured members together comprising: a bolt, said bolt having a bolt head, said bolt head having a drive means for driving said bolt, said bolt having a reduced diameter shank extending from said bolt head, said bolt head having an annular recess in said bolt head for clamping a hem in sealing engagement with the members to be fastened; a sealing capped nut, said sealing capped nut being made of a polymeric material, said sealing capped nut having a head providing clamping face and a reduced diameter thick wall shank portion consisting of an engagement insert of a metallic substance for threadably engaging said bolt, said sealing capped nut having a thin wall tubular shank portion, said recess comprising roll hem forming means operating when the bolt and capped nut are assembled to radially deform said thin wall shank portion to produce a radially extending peripherally continuous rolled hem having at least two radially extending layers for sealing engagement with said bolt and the apertured members.

12. A fastener for sealingly fastening apertured members together as set forth in claim 11, wherein said bolt shank provides a broadened portion near said bolt head, said thin wall shank portion engaging said broadened portion to form said hem within said recess.

13. A fastener for sealingly fastening apertured members together according to claim 11, wherein said bolt also has a tapped center for receiving in threaded engagement means for fastening cargo to the members.

14. A fastener for sealingly fastening apertured members together according to claim 11, wherein said internal drive means in said bolt is in the threaded end of said bolt and said sealing capped nut is tapped through to allow insertion of a tool therethrough to drive said bolt by means of said internal drive means in said bolt.

15. A fastener for sealingly fastening apertured members together according to claim 14, the threaded portion of said bolt has a breakaway portion such that upon tightening to a predetermined amount the threaded portion of said bolt breaks off substantially flush with said sealing capped nut.

16. A fastener for sealingly fastening apertured members according to claim 11, wherein said at least one of said heads has a drill-out dimple centered on the exposed face thereof.

17. A fastener for sealingly fastening apertured members according to claim 11, wherein said nut head has a tightness bulbous on the interior thereof for indicating by external visual inspection the tightness of the engaged bolt.

18. A sealing capped nut according to claim 11, wherein said thin wall shank portion has a bellows expander to allow for various thicknesses of members to be fastened together.

19. A fastener as set forth in claim 11, wherein said bolt is operable to form said hem to include a pair of radially extending substantially flat layers deformed from said thin wall shank portion.

* * * * *